March 17, 1942. H. C. HILL ET AL 2,276,396
CAM DRIVE GEAR
Filed Aug. 28, 1940 2 Sheets-Sheet 2

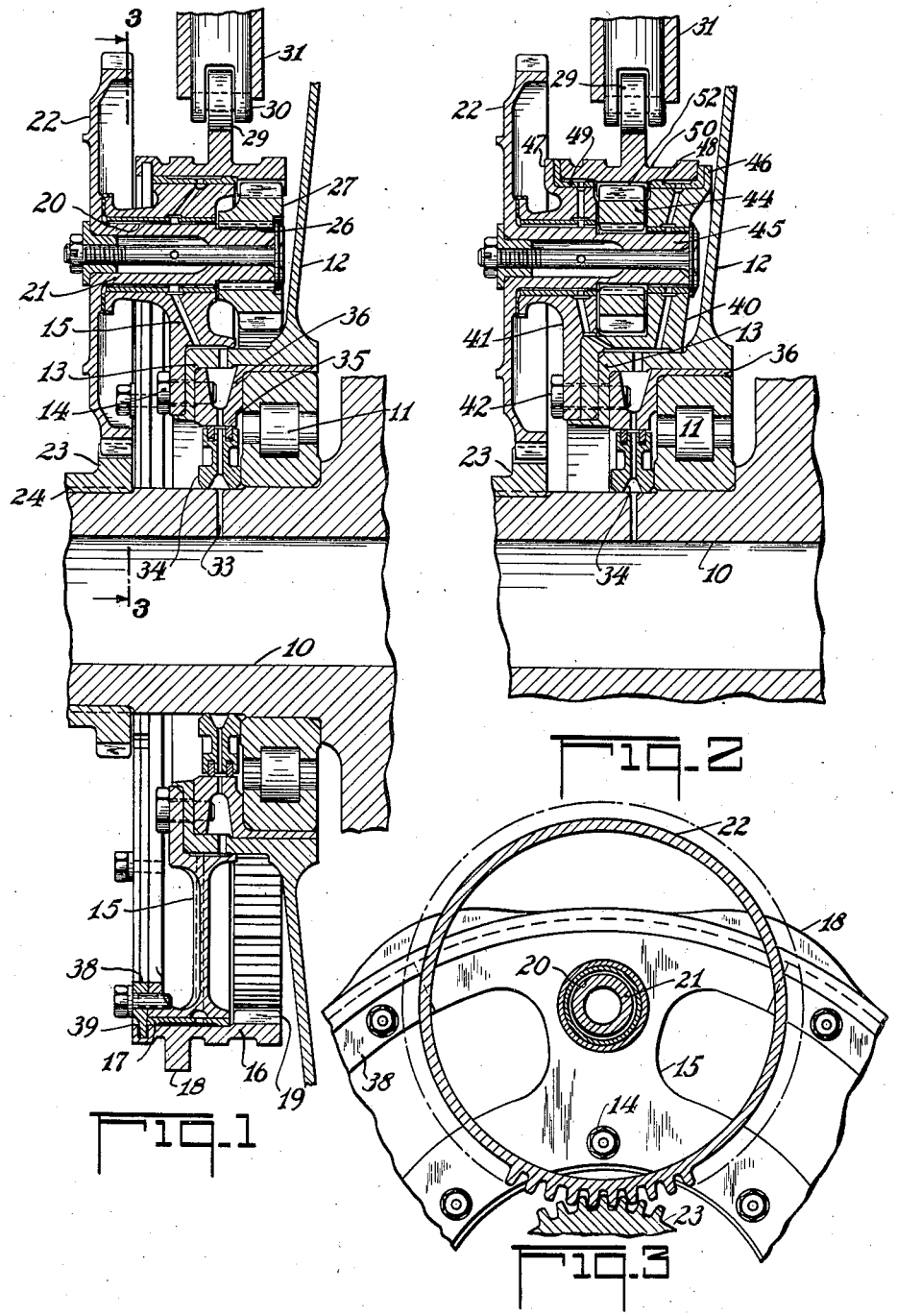

INVENTORS
WALTER A. WOLF.
HENRY C. HILL.
ALLAN CHILTON.
BY
ATTORNEY

Patented Mar. 17, 1942

2,276,396

UNITED STATES PATENT OFFICE 2,276,396

CAM DRIVE GEAR

Henry C. Hill, Montclair, Walter A. Wolf, Hackensack, and Allan Chilton, Ridgewood, N. J., assignors to Wright Aeronautical Corporation, a corporation of New York Application August 28, 1940, Serial No. 354,562

9 Claims. (Cl. 74—55)

This invention relates to cam driving and supporting mechanism for internal combustion engines, particularly with regard to radial cylinder engines which utilize a multi lobe ring cam concentric with the engine power shaft.

An object of the invention is to provide a mounting and driving system for a ring cam which will be rigid and free from the influence of operating stresses and strains caused by the power shaft.

A further object is to provide a thin cam ring on a large bearing which will be substantially free of operating deflections.

Still another object is to provide a gear driving system for a ring cam incorporating rigidly supported sturdy gearing so related to the cam that minimum deflections are set up therein during operation.

A further object is to provide a cam driving system in which comparatively large drive gears may be utilized to provide both greater strength in the drive system and greater ease of fabrication of the parts.

Further objects of the invention will become apparent in reading the annexed detailed description in connection with the drawings, in which:

Fig. 1 is a longitudinal section through the cam drive and front bearing of an engine, showing one embodiment of the invention;

Fig. 2 is a fragmentary longitudinal section showing an alternate embodiment;

Fig. 3 is a section on the line 3—3 of Fig. 1, and

Figure 4:
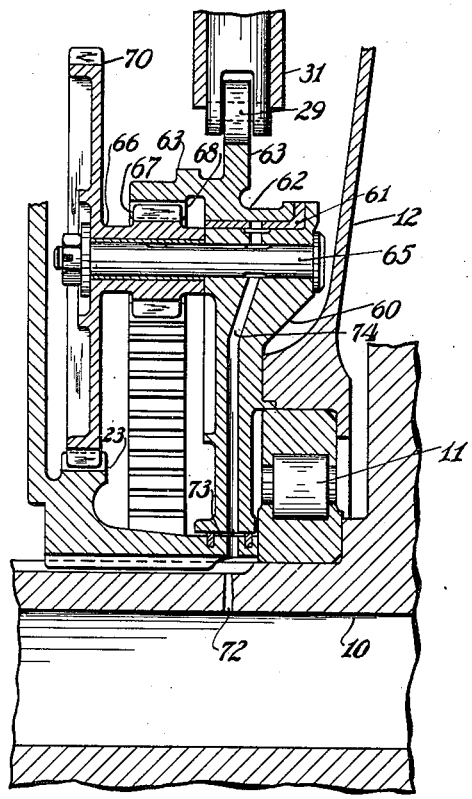
Fig. 4 is a fragmentary longitudinal section through a third alternative embodiment.

In the several figures, there are common parts which will be designated by the same reference characters. 10 represents an engine crankshaft carrying the crankpin at its righthand end and extending leftwardly for power delivery. The shaft is carried in a roller bearing 11 mounted in a main bearing diaphragm 12 cooperating with the engine cylinder in the usual manner.

Now referring to Fig. 1, the bearing diaphragm 12 is extended to the left of the bearing 11 as at 13 and to this extension is secured, by cap screws 14, a cam bearing member 15 whose periphery forms an annular cam bearing concentric with the shaft 10 and supporting an annular cam ring 16 through a bushing 17. Those portions of the ring 16 directly over the bearing member 15 carry cam lobes 18, the righthand end of the cam ring being formed with internal gear teeth 19. Journalled in the member 15 at 20 is a shaft 21 carrying a gear 22 at its lefthand end which meshes with a gear 23 splined at 24 to the shaft 10. The righthand end of the shaft 21 carries splines 26 engaged with a pinion 27 the teeth of which mesh with the teeth 19 of the cam ring gear.

It will be apparent that the drive from gear 23 to gear 22 comprises a gear reduction, and the drive from the pinion 27 to the ring gear teeth 19 comprise a further reduction to drive the cam ring 16 at reduced speed, the lobes 18 of the cam ring engaging cam follower rollers 29 journalled in cam followers 30 guided in cam follower guides 31.

Normally the shaft 10 comprises a pressure lubricant reservoir and lubricant is fed therefrom through a drive shaft drilling 33 to a bushing 34 rotatable therewith which is in fluid transfer engagement as at 35 with an element 36 between the bearing 11 and the extension 13. From this point, lubricant is carried through drillings, as shown, to the bearing 20 for the shaft 21 and thence to the large annular bearing between the member 15 and the cam ring 16. The cam ring is retained from axial displacement on the member 15 by split segmental locking pieces 38 secured to the member 15 and engaging a groove 39 formed in the left end of the cam ring 16.

The particular characteristic of this embodiment of the invention consists in centralizing the cam lobes over the cam bearing and in straddle mounting the cam drive gears on either side of the support member 15 which is free of deflections occurring in the bearing diaphragm 12 during engine operation.

In Fig. 2 the cam supporting member comprises halves 40 and 41 which are bolted together and to the bearing diaphragm extension 13 at 42. These two halves are spaced apart axially toward their peripheries to accommodate therebetween a cam drive pinion 44 mounted on a shaft 45 which is borne on either side of the pinion 44 in the members 41 and 42. The latter, at their peripheries, are provided with flanges 46 and 47 and also with bearing surfaces 48 and 49 upon which a cam ring 50 is carried. The cam ring is formed with internal bearing surfaces at its ends to engage the bearings 48 and 49 and between its ends is formed with internal gear teeth 52 engaged with the teeth of the pinion 44. The lefthand end of the intermediate shaft 45 carries the drive gear 22 meshed with the gear 23 mounted upon the shaft 10. The cam lobes on the cam element 50 are disposed across the face of the cam, as shown, and in this construction, the cam operating loads are well distributed over the split bearings 48 and 49 to the prevention of torsional or radial deflections. Also, by providing the cam drive at its center portion, through the gear teeth 52, there is no tendency for binding or wrapping of the cam on its bearing. Lubrication provisions for this arrangement are substantially similar to those shown in connection with Fig. 1, as is obvious from the drawing, the predominant difference being that the path of lubricant from the shaft 10 is divided so as to properly lubricate the divided bearings for the intermediate shaft 45 and for the cam 50.

In the arrangement shown in Fig. 4, an annular cam bearing member 60 is secured to the bearing diaphragm 12 adjacent the bearing 11 and this member is provided at its periphery with a bearing 61 upon which is mounted a large ring cam 62 having cam lobes 63 located substantially over the bearings. The member 60 carries a journal pin 65 on which is mounted, in cantilever fashion, a gear unit 66 comprising a pinion 67 engaging internal teeth 68 formed at one end of the cam ring 62 and comprises further a gear 70 meshed with the cam drive gear 23 on the main shaft 10. In this arrangement, pressure lubricant from the shaft 10 is carried through a drilling 72 to an oil transfer assembly 73 and thence through a drilling 74 to the bearing for the gear assembly 66 and the bearing for the cam 62.

Common to all of the several arrangements shown is the feature of providing a cam bearing and drive system which is virtually independent of deflections in the main bearing diaphragm 12. Furthermore, the cam bearing member and the large ring cam comprise an integral assembly which is not subject to any operating stresses except those occasioned by the cam drive alone, this assembly being removable as a unit from the engine without disturbing the bearing mounting of the main shaft in its diaphragm 12.

In all of the embodiments, the large cam ring with its integral internal gear is a part which may be easily fabricated, and the layshaft with its gears and pinions is a part or assembly which is simple in character and which permits of the use of gear units which have a sufficiently large number of teeth to assure smooth operation and accurate driving of the cam ring to afford precise valve timing for the engine in which the system is incorporated.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a cam driving mechanism for an engine including a main bearing housing and a drive shaft borne in the bearing thereof, an annular structure comprising a part separate from the housing but secured thereto adjacent said bearing, a cam journal formed at the periphery of said structure, a ring cam rotatable on said journal, and means to drive the ring cam from the drive shaft.

2. In a cam mechanism for an engine, a cam ring having lobes exteriorly thereof and having, internally thereof, a bearing portion and ring gear teeth axially spaced, a structure comprising a journal for said bearing portion, and a gear engaging said teeth journalled in the structure, said cam lobes being disposed in planes passing through said bearing portion.

3. In a cam mechanism for an engine, a cam ring having lobes exteriorly thereof, and having, internally thereof, axially spaced bearing portions and internal gear teeth between said bearing portions, a structure comprising axially spaced journals engaging the cam bearing portions, the structure being grooved between said journals, and a gear borne in the structure, disposed in said groove, and drivably engaging said internal gear teeth.

4. In a cam mechanism for an engine, a thin cam ring whose diameter is several times greater than the ring length and thickness, said ring being externally formed with lobes and being interiorly formed as a bearing, a substantially rigid journal structure with which the cam ring bearing is engaged, said cam ring being endowed with operating rigidity through its support on the rigid journal structure, said cam ring having integral gear teeth formed thereon, and driving gear means journalled in the structure inwardly of the journal engaged with said gear teeth.

5. In cam mechanism in an engine having a drive shaft, an annular rigid bearing structure embracing the drive shaft and formed exteriorly as a journal, a cam annulus borne on said journal, gearing driven by the drive shaft and carried by said structure for driving the cam annulus, and additional structure, separate from said bearing structure but to which the latter is secured, for supporting said drive shaft.

6. In a cam driving mechanism for an engine including a main bearing diaphragm and having a power shaft carried in the diaphragm bearing, an annular member secured to the diaphragm concentric with the bearing, said member having a layshaft journalled therein between its inner and outer circular borders, the outer border comprising a journal, a cam ring borne on said journal, part of the ring comprising an internal gear, and a gear on the layshaft drivably engaged with the internal gear.

7. In a cam driving mechanism for a radial cylinder engine comprising a main bearing diaphragm and a main shaft carried in the diaphragm bearing, an annular member secured to the diaphragm adjacent the shaft bearing and extending outwardly therefrom, a shaft carried by said member lying parallel to the annulus axis between its inner and outer diameters, a gear on said shaft, and a cam ring borne on the periphery of said member having gear teeth engaged by said gear.

8. In a cam driving mechanism for a radial cylinder engine comprising a main bearing diaphragm and a main shaft carried in the diaphragm bearing, an annular member secured to the diaphragm adjacent the shaft bearing and extending outwardly therefrom, a shaft carried by said member lying parallel to the annulus axis between its inner and outer diameters, a gear on said shaft, and a cam ring borne on the periphery of said member having gear teeth engaged by said gear, said gear and teeth lying to one side of said member and the lobes of said cam ring lying over the bearing between the cam ring and member.

9. In a cam driving mechanism for a radial cylinder engine comprising a main bearing diaphragm and a main shaft carried in the diaphragm bearing, an annular member secured to the diaphragm adjacent the shaft bearing and extending outwardly therefrom, a shaft carried by said member lying parallel to the annulus axis between its inner and outer diameters, a gear on said shaft, and a cam ring borne on the periphery of said member having gear teeth engaged by said gear, said member having a recess within which said gear and gear teeth are disposed, and the bearing between the cam ring and member lying on either side of said recess.

HENRY C. HILL.
WALTER A. WOLF.
ALLAN CHILTON.